US008934217B2

(12) United States Patent
Christensen et al.

(10) Patent No.: US 8,934,217 B2
(45) Date of Patent: Jan. 13, 2015

(54) MOTOR OPERATOR FOR SWITCHGEAR FOR MAINS POWER DISTRIBUTION SYSTEMS

(75) Inventors: Bruno Christensen, Nordborg (DK); Anders Lorenzen, Åbenrå (DK); Verner Smidt, Broager (DK); Jens N. Paulsen, Sønderborg (DK); Glenn Smith, Nottinghamshire (GB)

(73) Assignee: Linak A/S, Nordborg (DK)

( * ) Notice: Subject to any disclaimer, the term of this patent is extended or adjusted under 35 U.S.C. 154(b) by 223 days.

(21) Appl. No.: 12/312,220

(22) PCT Filed: Oct. 31, 2007

(86) PCT No.: PCT/DK2007/000464
§ 371 (c)(1),
(2), (4) Date: Apr. 30, 2009

(87) PCT Pub. No.: WO2008/052549
PCT Pub. Date: May 8, 2008

(65) Prior Publication Data

US 2010/0046146 A1 Feb. 25, 2010

(30) Foreign Application Priority Data

Oct. 31, 2006 (DK) ................................ 2006 01406

(51) Int. Cl.
*H02B 11/02* (2006.01)
*H01H 3/26* (2006.01)

(52) U.S. Cl.
CPC ........... *H01H 3/26* (2013.01); *H01H 2003/268* (2013.01)
USPC ........... 361/605; 361/601; 361/617; 361/622; 361/627; 361/632; 200/50.07; 200/50.25; 200/310; 200/330; 200/400

(58) Field of Classification Search
USPC ......... 361/600–605, 622–627, 630–633, 641, 361/643, 647, 610; 200/50.06, 50.07, 200/50.24, 50.25, 17 R, 320, 321, 317, 47, 200/331, 400, 51 R, 50.32, 329
See application file for complete search history.

(56) References Cited

U.S. PATENT DOCUMENTS 3,171,920 A * 3/1965 Klein et al. ..................... 335/69
3,296,565 A * 1/1967 Kiesel et al. .................... 335/69

(Continued)

FOREIGN PATENT DOCUMENTS

| | | | | |
|---|---|---|---|---|
| GB | 1348130 | 3/1974 | | |
| WO | WO 2006105881 A1 * | 10/2006 | ............... | H02B 1/36 |
| WO | WO 2007107198 A1 * | 9/2007 | ............... | H05K 7/20 |

*Primary Examiner* — Michail V Datskovskiy
(74) *Attorney, Agent, or Firm* — Dykema Gossett PLLC

(57) ABSTRACT

A power operator for switchgear for use in mains power distribution systems such as public medium high voltage distribution systems, where the switchgear comprises a closed cabinet (5) with an operating shaft protruding therefrom that is rotatable between two positions and has a coupling part. The motor operator includes a housing (11, 20, 21, 27) which is mountable on an external surface (4) of the switchgear cabinet (5), and a rotatable connection shaft connected to an electromechanical linear actuator. The connection shaft has a first coupling part which connects with the coupling part of the switchgear in a longitudinal axial sliding and non-rotational interlocking manner. The housing (11, 20, 21, 27) is a tube element which is tamper resistant, is relatively easy to seal against dust and moisture, and is inexpensive to manufacture.

25 Claims, 7 Drawing Sheets

(56) References Cited

U.S. PATENT DOCUMENTS

Figure 1:
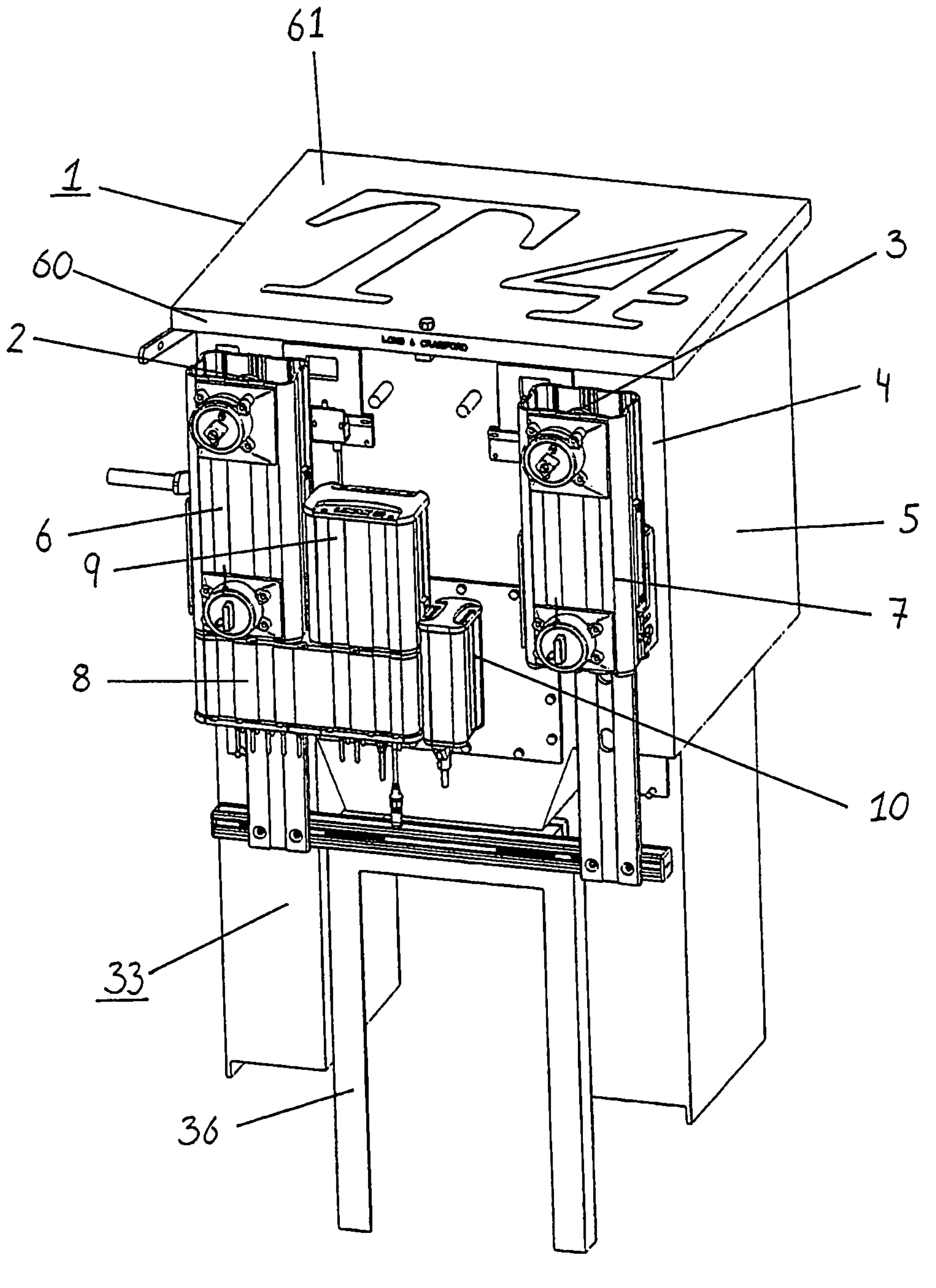

| | | | | |
|---|---|---|---|---|
| 3,633,075 | A * | 1/1972 | Hawkins | 361/616 |
| 3,911,240 | A * | 10/1975 | Henderson et al. | 200/400 |
| 4,118,639 | A * | 10/1978 | Rosey et al. | 307/147 |
| 4,311,353 | A * | 1/1982 | Adlerteg | 439/207 |
| 4,612,424 | A * | 9/1986 | Clark et al. | 200/50.18 |
| 4,649,238 | A * | 3/1987 | Beck et al. | 200/16 C |
| 4,652,966 | A * | 3/1987 | Farag et al. | 361/189 |
| 4,689,717 | A * | 8/1987 | Munzinger et al. | 361/618 |
| 4,804,809 | A * | 2/1989 | Thompson et al. | 200/17 R |
| 4,851,621 | A * | 7/1989 | Borchardt et al. | 200/50.05 |
| 4,860,161 | A * | 8/1989 | Maki et al. | 361/608 |
| 4,912,380 | A * | 3/1990 | Zylstra et al. | 318/285 |
| 4,926,286 | A * | 5/1990 | Maki et al. | 361/617 |
| 5,001,600 | A * | 3/1991 | Benson | 361/610 |
| 5,018,049 | A * | 5/1991 | Mehnert | 361/679.01 |
| 5,025,171 | A * | 6/1991 | Fanta et al. | 307/150 |
| 5,034,584 | A * | 7/1991 | Fanta et al. | 200/329 |
| 5,207,601 | A * | 5/1993 | Vasseur et al. | 439/715 |
| 5,219,070 | A * | 6/1993 | Grunert et al. | 200/330 |
| 5,254,814 | A * | 10/1993 | Harr | 200/17 R |
| 5,288,958 | A * | 2/1994 | Grunert et al. | 200/331 |
| 5,354,960 | A | 10/1994 | Erickson | |
| 5,453,587 | A * | 9/1995 | Hurley et al. | 200/50.24 |
| 5,475,190 | A * | 12/1995 | Smith et al. | 200/50.01 |
| 5,493,084 | A * | 2/1996 | Whitaker et al. | 200/50.05 |
| 5,515,235 | A * | 5/1996 | Stoller | 361/605 |
| 5,521,567 | A * | 5/1996 | Devonald et al. | 335/132 |
| 5,552,647 | A | 9/1996 | Tinkham | |
| 5,609,244 | A * | 3/1997 | Reiter | 200/43.11 |
| 5,805,813 | A * | 9/1998 | Schweitzer, III | 709/217 |
| 5,886,311 | A * | 3/1999 | Morel et al. | 200/17 R |
| 5,895,987 | A * | 4/1999 | Lo et al. | 307/125 |
| 5,992,646 | A * | 11/1999 | Benner et al. | 211/26 |
| 6,018,455 | A * | 1/2000 | Wilkie et al. | 361/676 |
| 6,075,215 | A * | 6/2000 | Bollinger et al. | 200/317 |
| 6,100,485 | A * | 8/2000 | Mortun et al. | 200/572 |
| 6,153,845 | A * | 11/2000 | Bollinger et al. | 200/400 |
| 6,155,658 | A * | 12/2000 | Woodward et al. | 312/204 |
| 6,190,081 | B1 * | 2/2001 | Besserer et al. | 403/231 |
| 6,194,983 | B1 * | 2/2001 | Bogdon et al. | 335/68 |
| 6,373,358 | B1 * | 4/2002 | Davies et al. | 335/202 |
| 6,395,066 | B1 * | 5/2002 | Tanihara et al. | 95/47 |
| 6,423,912 | B1 * | 7/2002 | Arenz et al. | 200/43.08 |
| 6,435,631 | B1 * | 8/2002 | Yee et al. | 312/204 |
| 6,512,669 | B1 * | 1/2003 | Goodwin et al. | 361/601 |
| 6,518,526 | B2 * | 2/2003 | Hamada et al. | 200/330 |
| 6,594,900 | B1 * | 7/2003 | Wei | 29/890.14 |
| 6,596,952 | B1 * | 7/2003 | Degrazia et al. | 200/330 |
| 6,606,229 | B2 * | 8/2003 | Takahashi et al. | 361/115 |
| 6,717,076 | B2 * | 4/2004 | Narusevicius et al. | 200/50.24 |
| 6,744,363 | B1 * | 6/2004 | Nicolai et al. | 340/506 |
| 6,777,627 | B1 * | 8/2004 | Stevenson | 200/50.21 |
| 6,797,903 | B1 * | 9/2004 | Winslett et al. | 200/331 |
| 6,849,811 | B1 * | 2/2005 | Heflin et al. | 200/1 R |
| 6,901,316 | B1 * | 5/2005 | Jensen et al. | 700/286 |
| 6,951,990 | B1 * | 10/2005 | Miller | 200/50.21 |
| 6,969,813 | B1 * | 11/2005 | Winslett et al. | 200/330 |
| 6,974,922 | B2 * | 12/2005 | Bortolloni et al. | 200/50.06 |
| 6,977,354 | B1 * | 12/2005 | Shea et al. | 218/157 |
| 7,004,059 | B2 * | 2/2006 | Kuczera et al. | 91/1 |
| 7,190,382 | B1 * | 3/2007 | Retlich et al. | 345/530 |
| 7,214,895 | B2 * | 5/2007 | Houck et al. | 200/310 |
| 7,236,351 | B2 * | 6/2007 | Chavot et al. | 361/604 |
| 7,238,903 | B2 * | 7/2007 | Fischer | 200/330 |
| 7,361,857 | B2 * | 4/2008 | Suh | 200/330 |
| 7,612,988 | B2 * | 11/2009 | Ulinskas | 361/614 |
| 2002/0073624 | A1 * | 6/2002 | Hartel | 49/501 |
| 2002/0100674 | A1 * | 8/2002 | Rosen et al. | 200/400 |
| 2002/0104747 | A1 * | 8/2002 | Turner et al. | 200/330 |
| 2003/0065459 | A1 * | 4/2003 | Huber et al. | 702/62 |
| 2003/0173336 | A1 | 9/2003 | Thursesson et al. | |
| 2004/0098148 | A1 * | 5/2004 | Retlich et al. | 700/83 |
| 2004/0099515 | A1 * | 5/2004 | Houck, III | 200/50.07 |
| 2005/0051414 | A1 * | 3/2005 | Subramanian et al. | 200/401 |
| 2006/0000697 | A1 * | 1/2006 | Houck et al. | 200/316 |
| 2006/0129281 | A1 * | 6/2006 | Cargnelli et al. | 700/292 |
| 2006/0150572 | A1 * | 7/2006 | Rawson-Harris | 52/736.2 |
| 2006/0162946 | A1 * | 7/2006 | Hartel et al. | 174/9 F |
| 2007/0019369 | A1 * | 1/2007 | Merkel et al. | 361/605 |
| 2007/0025087 | A1 * | 2/2007 | Chen | 361/704 |
| 2007/0095640 | A1 * | 5/2007 | Fischer | 200/330 |
| 2007/0131526 | A1 * | 6/2007 | Jones et al. | 200/2 |
| 2007/0230094 | A1 * | 10/2007 | Carlson | 361/625 |
| 2008/0023211 | A1 * | 1/2008 | Yee et al. | 174/50.52 |
| 2008/0077268 | A1 * | 3/2008 | Retlich et al. | 700/117 |
| 2008/0247123 | A1 * | 10/2008 | Ulinskas | 361/605 |
| 2008/0258667 | A1 * | 10/2008 | Morris et al. | 318/490 |
| 2008/0290771 | A1 * | 11/2008 | Jimenez | 312/263 |
| 2009/0052121 | A1 * | 2/2009 | Schmitt et al. | 361/605 |
| 2011/0158615 | A1 * | 6/2011 | Schneider et al. | 392/397 |
| 2011/0192707 | A1 * | 8/2011 | Sorensen | 200/50.25 |

* cited by examiner

MOTOR OPERATOR FOR SWITCHGEAR FOR MAINS POWER DISTRIBUTION SYSTEMS

BACKGROUND OF THE INVENTION

1. Field of the Invention

The invention relates to a motor operator for opening or closing contacts of a switchgear adapted for use in mains power distribution systems such as public medium high voltage distribution systems. The motor of the operator may be activated either locally or remotely to open or close the contacts of the switchgear. Alternatively, a drive element normally coupling the motor to the contact operating shaft is selectively removable so that a wrench may be used to manually open and close the contacts in case of failure of the motor operator, or as a safety precaution.

2. Description of the Prior Art

Underground or pole-mounted electrical transmission and distribution systems include a main service line leading from a sub-station with a number of individual distribution lines along the main line connected thereto. It is often the practice, particularly where power is supplied to a user entity such as a discrete residential area, industrial area or shopping area, to provide switchgear in each of the lateral distribution lines connected to the main line in order to enable selective de-energization of the lateral distribution line without the necessity of de-energizing all of the lateral distribution lines. Switchgear conventionally includes electrical, movable contacts which may be opened and closed by maintenance personnel, in case of fault in or maintenance of a distribution line. In a particularly useful type of switchgear, the contacts are mounted under oil or in an inert gas atmosphere.

Generally, the contacts of switchgear require snap action opening and closing mechanisms to minimize arcing and assure a positive closing of the contacts. Actuation of the switch operating mechanism has normally been accomplished manually, requiring service personal to locate and travel to the switchgear in question. Recently, there has been increased interest in switch contact actuating mechanisms that are motor operated and can be activated at remote locations as well as manually locally. In some cases motor operators have been installed within the switchgear cabinet itself for powered actuation of the opening and closing mechanism. By design, these motor operators are not suitable for installation on a retrofit basis on an external side of an existing switchgear cabinet. Moreover, most of the available motor gear operators are relatively expensive, both in terms of cost for various components as well as expenses for installation of the same. Furthermore, these motor operators do not readily lend themselves to manual actuation in the event of motor failure or in the event that the operator desires to open the switch contacts by hand.

As a consequence of the fact that it is almost impossible to incorporate a motor operator in a switchgear cabinet, there is an increased interest in motor operators that can be mounted externally to the cabinet of the switchgear. In this respect it should be noted that it is not allowed to make any holes in the cabinet or make any weldings, which renders the mounting very difficult. It should also be considered that in most cases the motor operator should not only be weather proof but also secured against unauthorized intrusion. Further, it should be fully operable under all weather conditions and operate in a reliable manner.

An example of a motor operator to be mounted externally on a switch gear is dealt with in U.S. Pat. No. 4,804,809. This motor operator may even be mounted as a retrofit unit. The motor operator is composed of an assembly of individual elements mounted in a housing, necessitating a tedious dismounting of the connection between the motor operator and the switchgear for manually operating the switchgear. Further, the motor operator has to be designed for each individual types of switchgear. This renders the motor operator costly. The housing is designed as a regular locker of sheet metal with a door hinged at one side. It should be taken into consideration that the motor operator is located outdoors and subject to dust, rain and snow. The motor operator should operate perfectly under all weather conditions. For safety reasons, the housing should only be accessible to authorized personal and it should be secured against intrusion and vandal proof. In this sense it is fairly easy to get access to a locker.

Hence, there is a need for a motor operator which overcomes these and other problems associated with known devices.

SUMMARY OF THE INVENTION

It is an object of the present invention to provide a motor operator which is easy to mount and can be mounted on switchgear from various manufactures of switchgear and which to a great extend is none-intrusive and vandal proof.

According to the invention this is accomplished in that the housing is made of a tube element with at least one end cover. The wall making up the tube element is by definition dust and moisture proof. It is also non-intrusive as the wall is free from gaps. When closed by end covers, the tube element is, as a whole, weather proof, and by using appropriate means, e.g., burglar-proof screws to secure the end covers to the tube element, it is also, as a whole, non-intrusive. Also, the tube element is rigid and able to resist blows and strokes. As to the manufacturing, a tube element is also advantageous as it can be cut from a length of pipe.

In an embodiment the housing is divided in a first sub-housing for a drive unit of the motor operator and a second sub-housing for electrical equipment. As to the manufacturing, this is advantageous as the mechanical parts and the electrical equipment is usually made at different production lines. Also in case of a major overhaul or fault in one of the parts, this could simply be replaced and brought in for service. In case of use of a rechargeable battery package, it is also preferable to divide the housing into a further third sub-housing for a rechargeable battery package. This makes it easy to replace the battery package if needed. A further division into a fourth sub-housing could be beneficial in case of auxiliary equipment to costumers demand such as implementing a location system, e.g., a GPS.

Although the cross section of the tube element could have various geometric shapes, it has proven favorable that the tube element has a rectangular or in essential a rectangular cross section. This makes the installation more comfortable, and in case it is divided into sub-housings, the lay-out of these also becomes straightforward. E.g., that the lay-out of the cross section of the second sub-housing is such that the first and the third sub-housing could be arranged on top of the second sub-housing within its perimeter.

The housing could be made of various materials, e.g., a heavy duty and weather-resistant plastic; however, metal is preferred, and tube elements of extruded aluminum show good design and constructive qualities. Screw channels, preferably located in the interior of the tube element for mounting purposes is easily made in extruded aluminum tubes and so are longitudinal tracks, preferably dove-tailed shaped tracks on the sides for receiving connection elements, preferably having a dove-tailed shape.

In a preferable embodiment the top end cover has a rim running on the exterior surface of the tube-shaped element guiding water away from the contacting surfaces between the tube element and the cover. Further, the end cover preferably has a dome shape, such that water run off.

For the purpose of placing sub-housings on top of the second sub-housing, it has a planar top end cover which serves as a base for at least the first sub-housing and the top end cover has an outer shape mating the cross-section of the second sub-housing.

As to a bottom end cover, it preferably has an outer shape mating or essentially mating the cross section of the tube element. The edge of the cover might even be withdrawn slightly from the walls of the tube element. This prevents water from running down the wall of the tube element to get caught by the end cover and penetrate the interior; instead, it drips freely off the exterior of the housing.

In an embodiment the motor operator comprises a framework for carrying the housing and the framework is designed for fixedly mounting outside the range of the cabinet of the switchgear, preferably mounted on a substructure of the switchgear. Accordingly, the motor operator can be mounted without the necessity of using fastening means on the switchgear housing itself.

In an embodiment the framework comprises a vertical beam to which the housing of the motor operator can be mounted. Using a vertical beam means that it is a simple manner to mount the motor operator and it also has the advantage of it being relatively easy to position the motor operator in a correct position to the switch gear.

In a further elaboration the vertical beam has one essentially U-shaped mounting bracket by means of which the housing of the motor operator is mounted to the vertical beam. The housing and the U-shaped mounting bracket could be mutually fixed by means of connection elements, preferably having a dove-tailed shape mating longitudinal tracks in the tube element constituting the housing or sub-housing. The first, second and fourth sub-housing are preferably interconnected by means of connection elements. However, as to the third sub-housing, it is preferably attached to the first and second sub-housing by means of screws received in the screw channels.

In a preferred embodiment the framework comprises a lateral beam to which the vertical beam can be fixed. The lateral beam can be exploited to mount the housings of two motor operators side by side. The vertical beam can be fixed to the lateral beam in that the lateral beam has a longitudinal track for receiving a retaining plate to which the vertical beam can be fixed by screws. This makes it easy to adjust the position of the housings of the motor operator in sideward direction.

The framework could be mounted to a substructure of the switchgear or the framework could be designed to be fixedly mounted in the ground in front of the switchgear. Both solutions have their own advantages.

As to the lateral beam, this can be mounted on a substructure in various ways; however, mounting brackets are preferred as they are simple and easy to adjust. The substructure could be furnished with a pair of prongs for receiving the mounting brackets, which are of the clamping type with a hole for the prongs.

In general, the cabinet of a switchgear has a roofing made of metal sheet with a descending edge. In an embodiment this is exploited to attach the upper part of the housing of the motor operator to the switchgear by means of a mounting bracket which could be fixed to the descending edge of the roof of the switchgear. This stabilizes the vertical beam carrying the motor operator and thus a vertical beam with lower rigidity could be exploited.

Many switchgears comprise two individual sets of contacts. According to the invention in order to operate such type of switchgear, the motor operator comprises two first sub-housings for respective drive units for operating two individual operating shafts of the switch gear and one second sub-housing for common electrical equiment and possibly one third sub-housing for a common rechargeable battery package.

An embodiment of the invention will be described in the following with reference to the accompanying drawing.

BRIEF DESCRIPTION OF THE EMBODIMENTS

Figure 2:
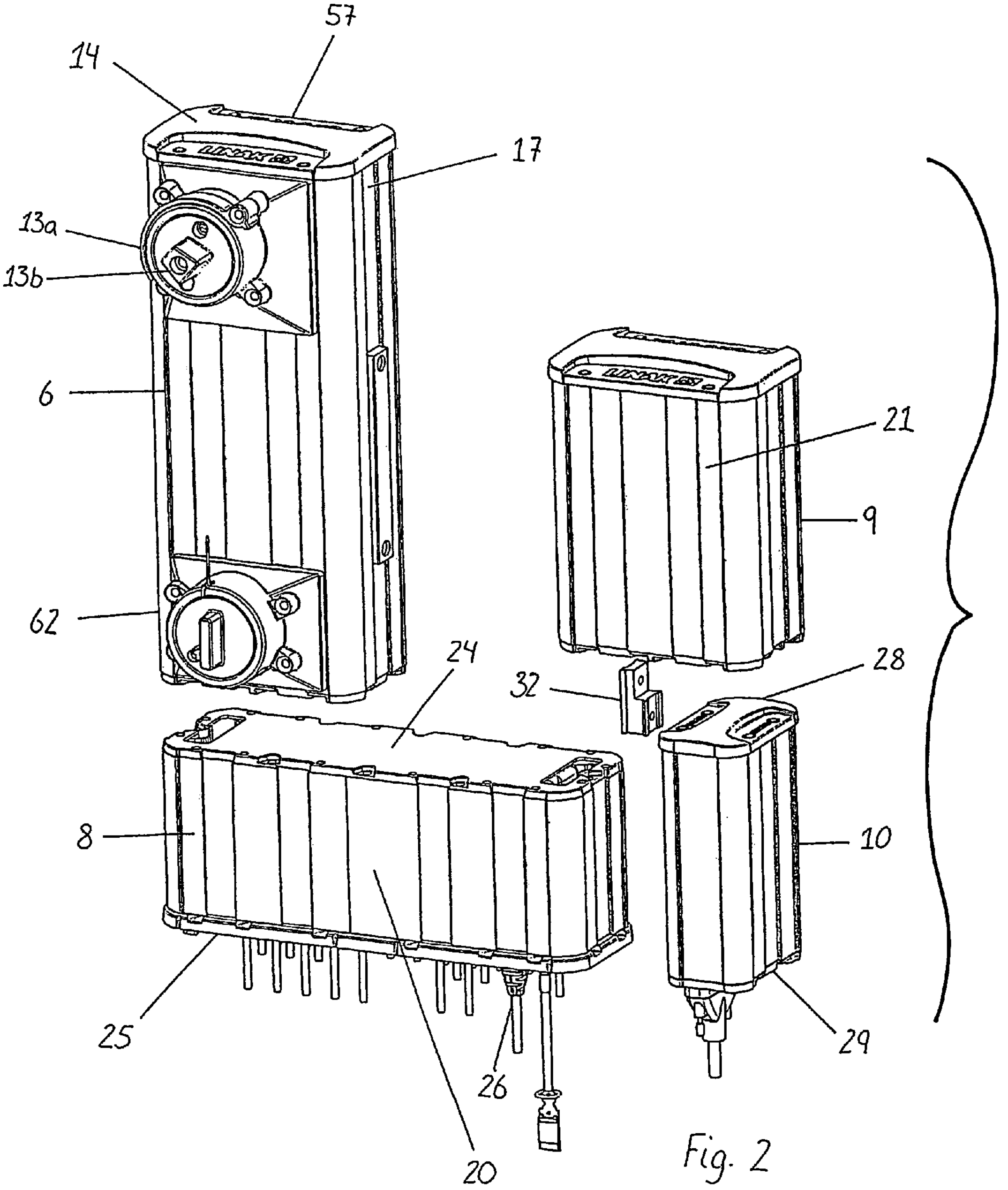
Figure 3:
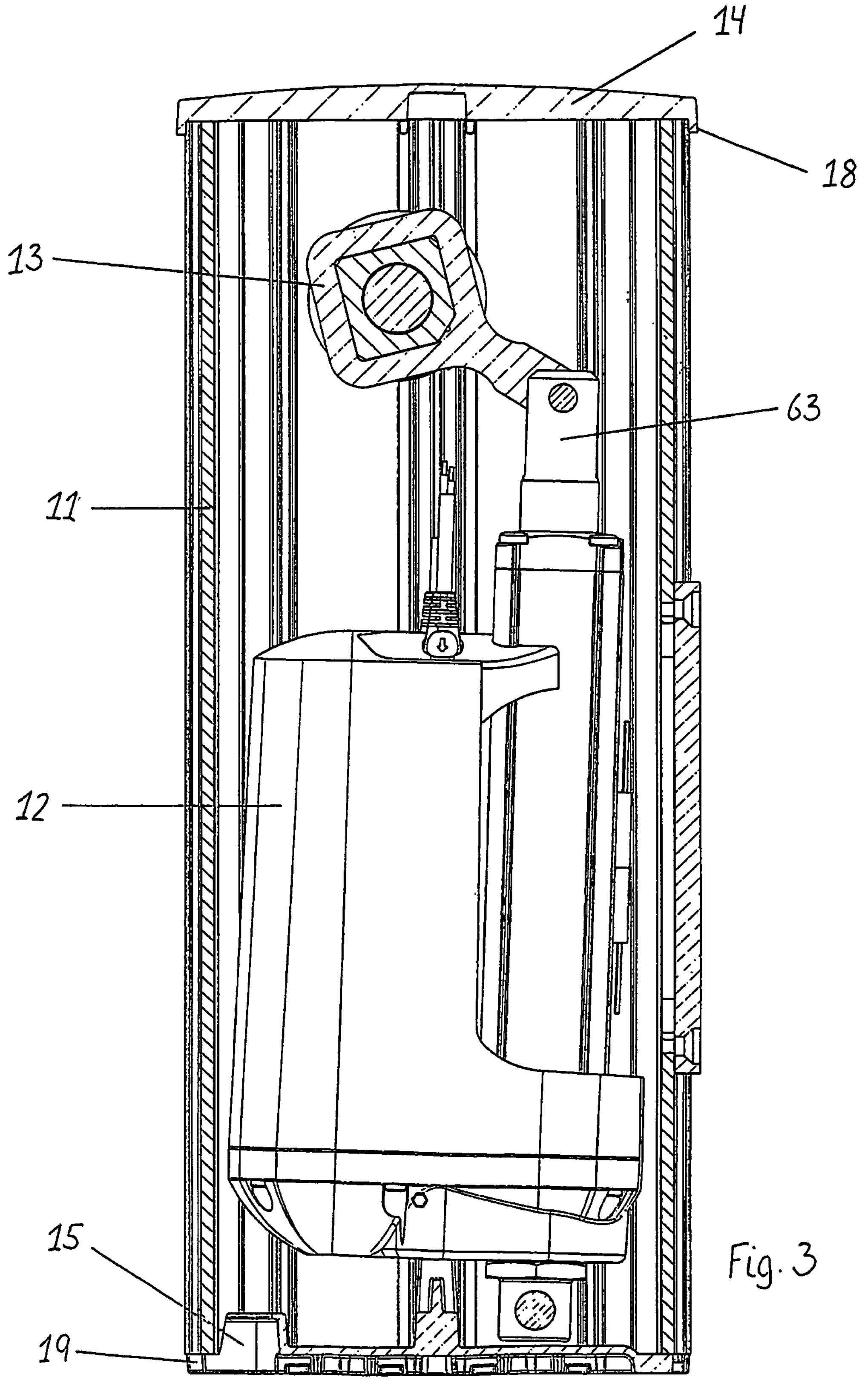
Figure 4:
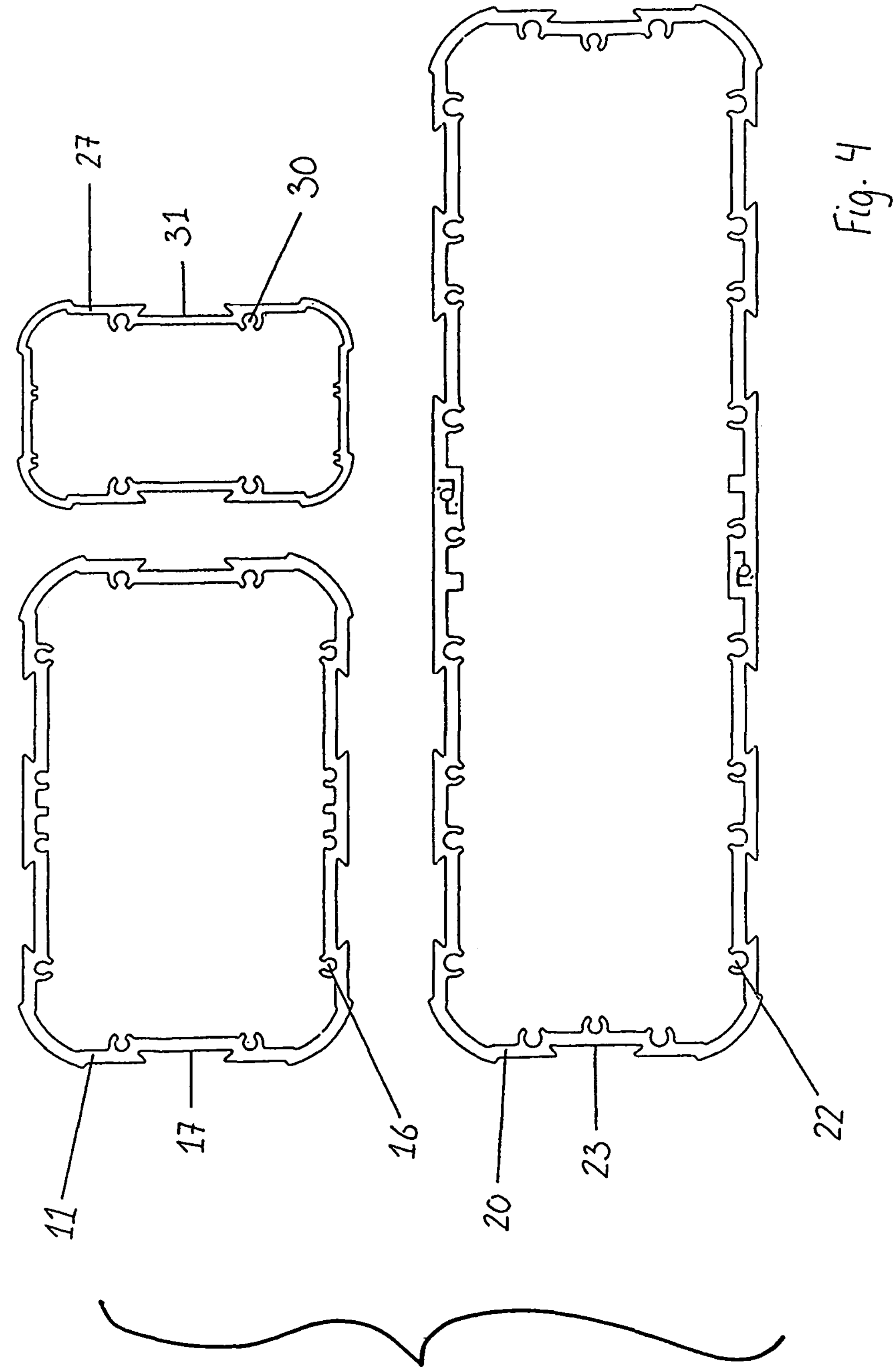
Figure 5:
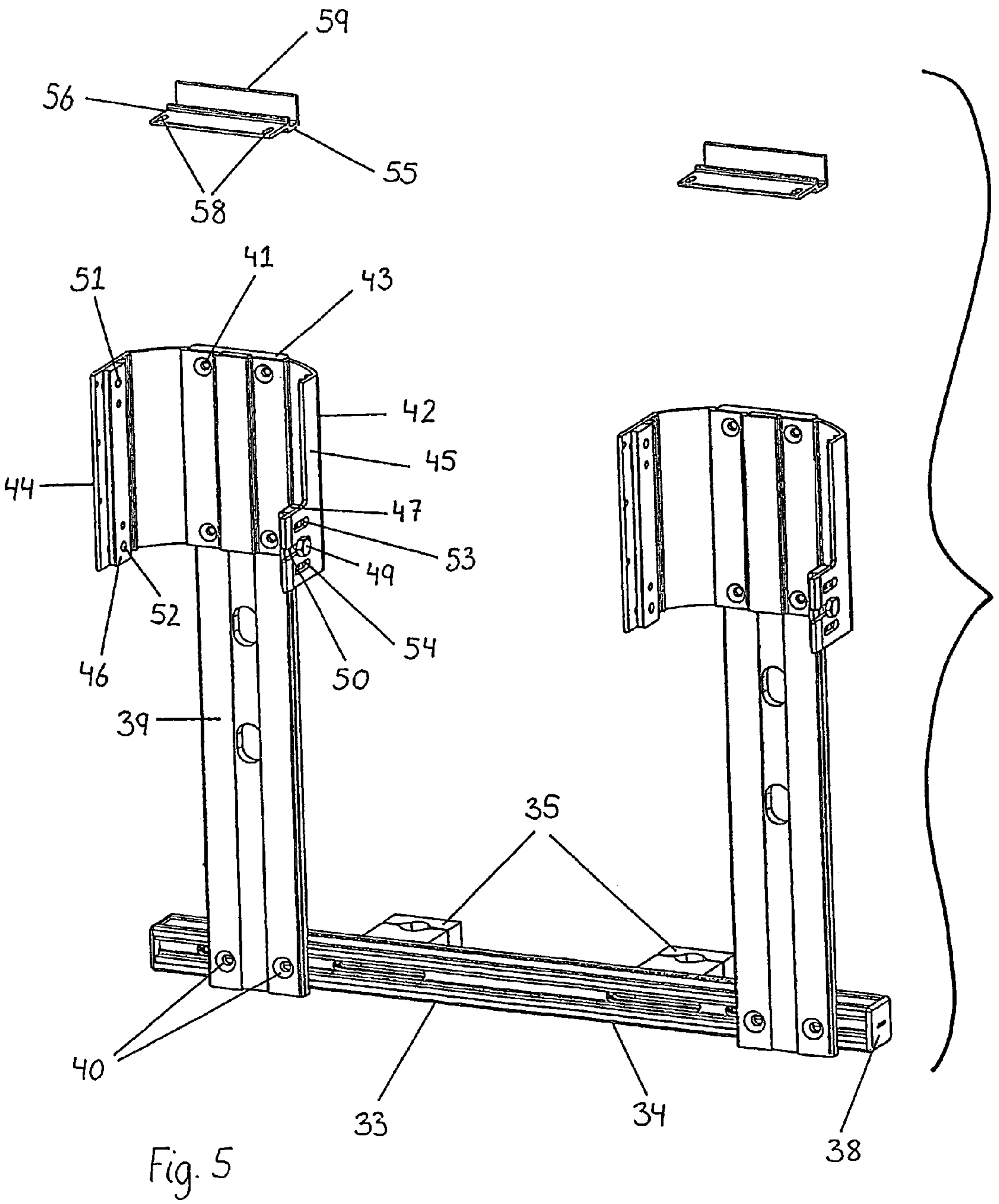
Figure 6:
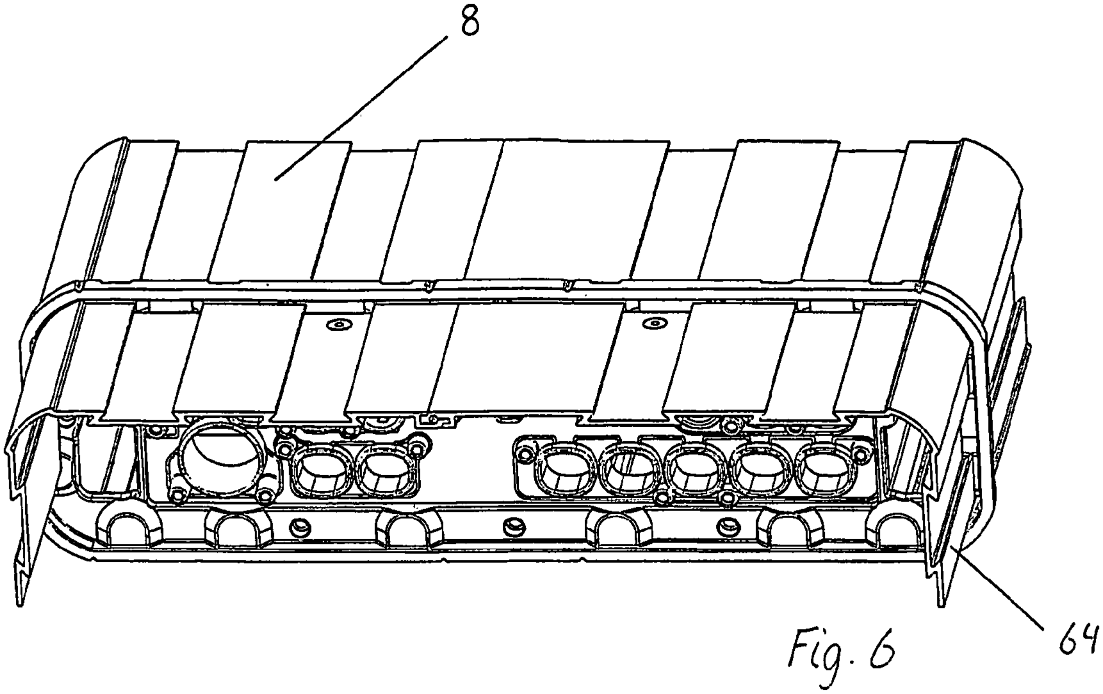
Figure 7:
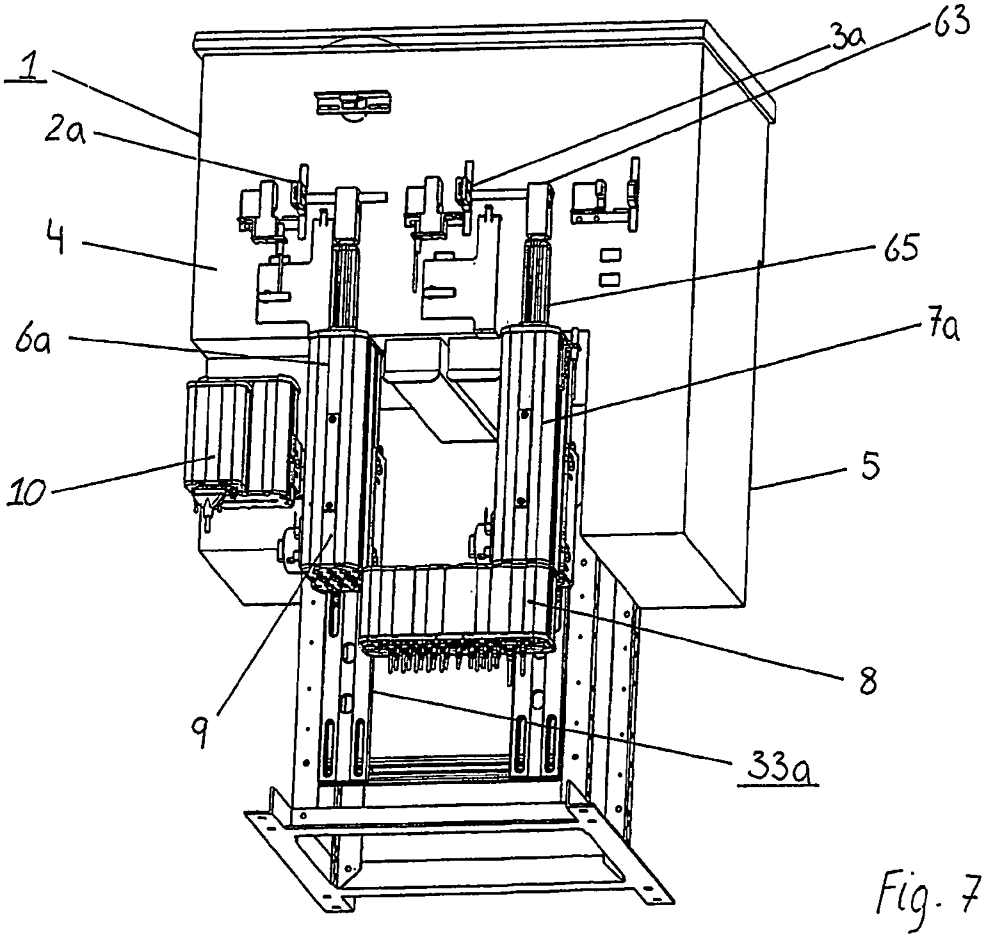
Figure 8:
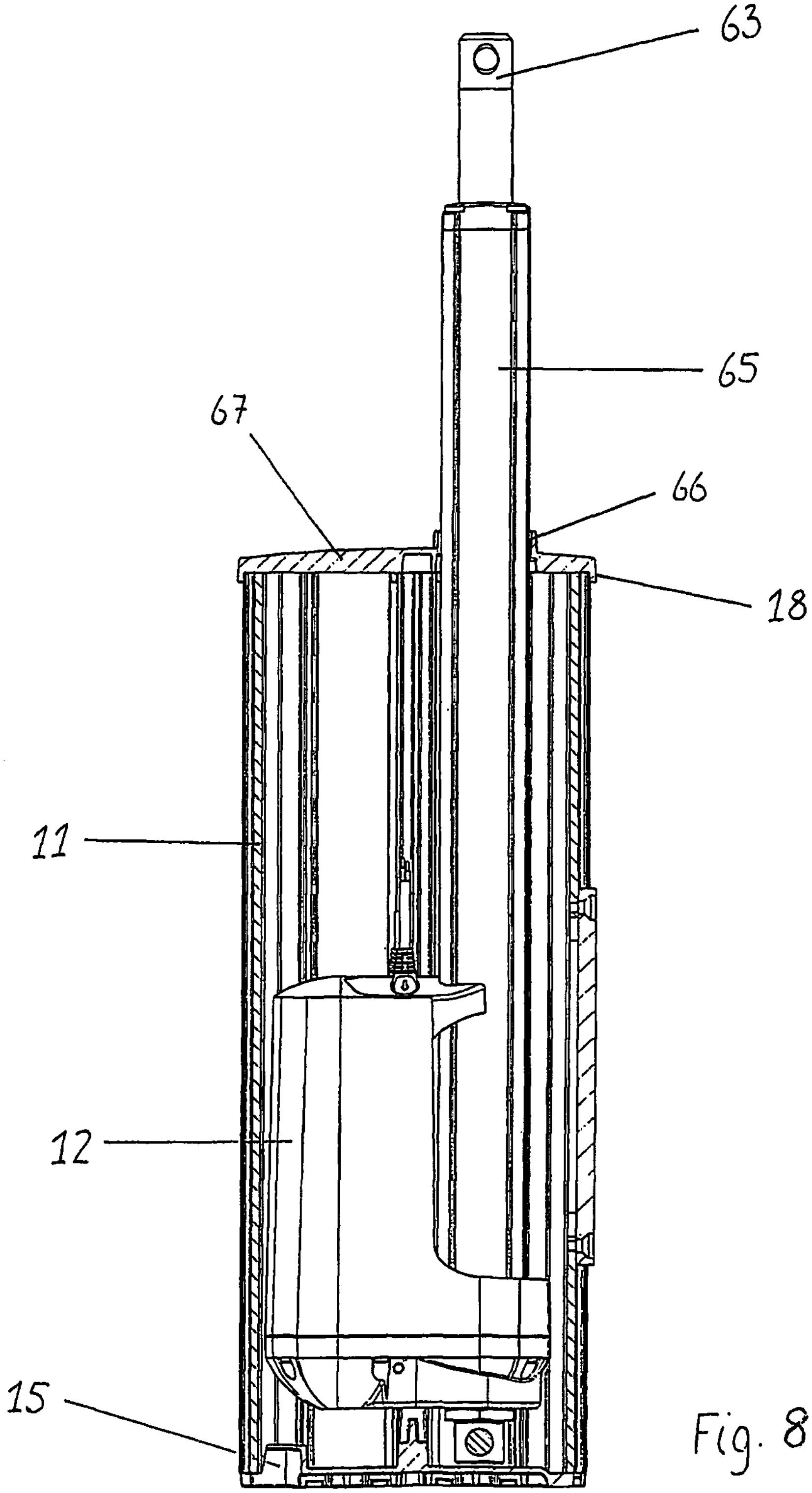

FIG. 1 is a perspective view of a switchgear seen from the front furnished with a motor operator, FIG. 2 is a view of the individual sub-housings of the motor operator, FIG. 3 is a view of longitudinal a section of cross the drive unit of the motor operator, FIG. 4 is a cross section of the tube elements of the sub-housings of the motor operator, FIG. 5 is a front perspective view of a framework for mounting the motor operator, FIG. 6 is a perspective view of the control unit seen from below and furnished with a shield for the a cables, FIG. 7 is a perspective view of another type of a switchgear seen from the front and furnished with a motor operator, and FIG. 8 is a longitudinal section cross in another embodiment of the drive unit of the motor operator.

DETAILED DESCRIPTION OF THE PREFERRED EMBODIMENTS

FIG. 1 is shows a switchgear 1 with to sets of electric contacts operated by a rotary shaft ending in dogs 2,3 at the front side 4 of the cabinet 5 of the switchgear. The electric contacts are controlled by a motor operator with respective drive units 6,7. Further the motor operator comprises a control unit 8 and a rechargeable battery package 9, which is common for the two drive units 6,7. According to customer's demand, there could be a separate modem unit 10, such as PAKNET(™ to Vodafone).

The drive unit 6 comprises a first sub-housing 11 for the mechanical parts including an electric motor. Specifically the drive unit comprises a electro-mechanical linear actuator 12 operating a rotatable connection shaft with a coupling part 13 engaging the operating shaft 2 of the switchgear. The sub-housing 11 is an extruded aluminum tube element having an in essential rectangular cross section. The ends of the tube element are closed with a top end cover 14 and a bottom end cover 15. The covers are secured with screws received in longitudinal screw channels 16 in the interior of the tube element 11. On the outside of the tube element 11 are dove-tailed grooves 17 for mounting purposes to be explained in the following. The end covers are of die-cast aluminum, and between the covers 14, 15 and the tube-element a sealing arranged. The top end cover 14 is generally dome-shaped, such that water by gravity will run off. Further, the top end cover 14 has a rim 18 running on the exterior of the tube element guiding water away from the dividing line between the top end cover and the tube element. As it appears from FIG. 3, the edge 19 of the bottom end cover 15 is retracted a small distance from the outer wall of the tube element 11 so that water will drip off from the outer edge of the tube element.

The drive unit 7 is identical to the drive unit 6. It should be noted that FIG. 1 the top end covers are removed from the drive units 6,7.

As to the control unit 8 this is located in a second sub-housing 20 and the rechargeable battery package 9 is located in a third sub-housing 21. The sub-housing 21 is identical to the sub-housing 11, the only difference being that the length of the tube element itself is shorter. The second sub-housing 20 for the control unit containing the electrical equipment such as the control equipment is also an extruded aluminum tube element, the cross section of which is shown in FIG. 4. This sub-housing 20 also has internal screw channels 22 and external dovetail grooves 23. The cross section of the tube element of the sub-housing 20 corresponds to the cross section of the tube elements of the first and third sub-housings 11,21. The depth is the same, but the width is twice the width of the tube element of the first and third sub-housings. The tube element of the second sub-housing has a planer top end cover 24 serving as a base for the first and third sub-housings 11, 21 arranged on top of the second sub-housing 20. They could be mutually fixed exploiting the internal screw channels, namely by a long screw extending from the underside of the second sub-housing 20 reaching into the screw channels of the first and third sub-housings 11, 21. The bottom of the tub-element is closed by a bottom end cover 25 with sockets for various electric cable connections, indicated by 26. In the top end cover 24 are through holes also for electric cable connections to the drive unit 6 and the battery package 9.

As to the separate modem unit 10, this is located in the fourth sub-housing 27, also made up of a tube element of extruded aluminum and a top end cover 28 and bottom end cover 29 also of die-cast aluminum. The cross section of the tube element has a depth corresponding to the depth of the other tube elements and has also screw channels 30 and dovetailed tracks 31. The modem unit 10 could be fixed to the housing of the battery package as indicated in FIG. 1. To this end a connection member 32 is used, the connection member 32 having dovetails at either sides mating the dovetailed tracks on the side surfaces of the sub-housings of the battery package and the modem unit. The connection member is fixed by means of screws in the holes indicated.

As it appears from FIG. 1, the motor operator is mounted on a framework 33 arranged up front of the front surface of the switch gear 1. Referring to FIGS. 1 and 5, the framework comprises a lateral beam 34 which at a rear side facing the front side of the switchgear can be furnished with a pair of mounting brackets 35 by means of which the lateral beam can be mounted on a U-shaped frame 36. The U-shaped frame 36 is part of the support structure of the switchgear by means of which, it is fixedly mounted in the ground. On the vertical part of the U-shaped frame there is a pair of upright prongs (not shown) for receiving the mounting brackets 35 which is of the clamping type with a hole for the prongs.

On its front side, the lateral beam 34 has a C-shaped track 37 for receiving a retaining plate (not shown). The ends of the lateral beam 34 are closed with end plates 38. A lower end vertical beam 39 can be attached to the lateral beam 34 by means of a pair of screws in the holes 40 received in the retaining plate and thereby fix the vertical beam 39 to the lateral beam 34. At an upper end of the vertical beam 39 there is by means of screws 41 attached an essentially U-shaped mounting bracket 42. The central back portion of the mounting bracket 42 has a U-shaped track receiving the vertical beam 39 and supporting it in sideward direction. The U-shaped mounting bracket 42 has a first side wall 44 and a second side wall 45. The drive unit 6 is placed in the mounting bracket 42 between the two side walls 44,45. However, before doing so a connection element 46, 47 having a dovetailed cross section is located in the dovetailed tracks 17 on either side of the housing of the drive unit 6. The connection elements are fastened by means of a pair of tailstock screws. A screw bolt 49 is placed in the right hand side connection element 47. In the right side wall 45 of the mounting bracket there is a horizontal slit 50 for receiving the shaft of the screw bolt 49. Accordingly, when locating the drive unit 6 in the mounting bracket 42 the weight of the drive unit is carried by the screw bolt 49. In the other side wall 44 there are horizontal longitudinal holes for inserting screw bolts 51, 52, which are screwed into threaded holes in the connection element 46. Accordingly, the drive unit could be adjusted to and from the back portion of the mounting bracket. Further, the drive unit could be adjusted up and down by loosing the tailstock screws through the horizontal longitudinal holes 53, 54. Accordingly, the position of the drive unit 6 in relation to the connection shaft 2 of the switchgear is easy to adjust as the position of the drive unit 6 could be adjusted laterally as well as horizontally and also to and from the switchgear.

To stabilize the drive unit 6, the top of it can be furnished with a plate-shaped fixture 55 having an essentially angular shape with a horizontal flange 56 to be placed in a countersinking 57 on top of the top end cover 14. The leg 56 has a pair of screw holes 58 mating the screws for fastening the top end cover. An upright flange 59 of the fixture 55 is meant to grip around a descending edge 60 of a roofing 61 of the switchgear and thereby resting in the gab between the descending edge 60 of the roofing and the front side of the cabinet of the switch gear. Preferably, the outmost area of the descending edge rests in a groove in the fixture.

The other drive unit 7 could be mounted by similar means and in a similar manner as indicated in FIG. 1.

Needless to say, any necessary apertures and holes can be machined in the tube elements.

For completeness reference numeral 13*a* indicates an external operating knob device at the end of coupling part 13 for manually operating the switchgear. The invention allows the existing switchgear handle to be used, as the dog 13*b* has the same shape as on the switchgear. Reference numeral 62 indicates an operating knob device for releasing the thrust rod 63 of the linear actuator from the drive motor when manually operating the switchgear.

As it would be apparent from the above, the housing of the motor operator comprises the following five sub-housings, namely the first two sub-housings for the drive units 6,7, the second sub-housing 20 ,of the control unit 8, a third sub-housing 21 for the rechargeable battery package 9, and finally the fourth sub-housing 27 for the separate modem unit 10.

To protect the sockets and interconnection cables at the bottom of the control unit 8, this can be furnished with a U-shaped shield 64 having a cross section coherent with the cross section of the sub-housing of the control unit 8. Accordingly, the sockets and interconnection cables are located between the shield 64 and the front surface 4 of the switchgear housing.

The above description relates to a motor drive for a switch gear where the operating shaft 2,3 is rotatable about its longitudinal axis. However, there are also known switchgears where the operating shaft 2*a*, 3*a* can rotate about a transverse axis, c.f. FIG. 7. A drive unit 6 for such types of switchgears is shown in FIG. 8. For the same parts as in the drive unit shown in FIG. 3, the same reference numerals are used. As it can be seen from the drawing an outer tube 65 of the electromechanical actuator 12 passes through a hole 66 in the top end cover 67 and is sealed against the rim of the hole. The thrust rod 63 of the linear actuator is connected directly to the operating shaft 67 of the switchgear.

In FIG. 7 it is seen that the individual sub-housings are arranged differently than at the switchgear shown in FIG. 1, proving the flexibility of the motor operator according to the invention. The rechargeable battery package 9 is mounted separately on the framework 33*a* and the modem unit 10 is attached to the battery package 9. Thes drive units 6*a*, 7*a* of the type shown in FIG. 8 are mounted with a side on the framework 33*a,* i.e, it is arranged perpendicular to the front side 4 of the housing 5 of the switchgear. The control unit 8 is mounted on the bottom end of the drive unit 7*a,* i.e., perpendicular to each other which is possible due to the lay-out of the cross-sections of the housing. Accordingly, it would be understood that the drive unit, the control unit, the rechargeable battery and the modem unit could be mutually interconnected or mounted separately.

In the embodiment described above tube elements with a rectangular cross section are indicated, however, it is obvious for a skilled person that other tube elements with a different cross section could be used evidently a tube element with a square cross section. However, also tube elements with different cross sections could be used such as a rectangular combined with a circular cross section.

The invention claimed is:

1. A motor operator for a high voltage switchgear used in a mains power distribution system, said switchgear including a cabinet having an exterior wall and containing an operating shaft which extends through said exterior wall to an end that includes a first coupling part, said operating shaft being rotatable between at least two positions, said motor operator comprising:

a first sub-housing containing a drive unit having an electric motor and a second coupling part in connection with the electric motor which fits the first coupling part of the operating shaft in an interlocking manner for rotation of said operating shaft with operation of said drive unit, said first sub-housing comprising a first one-piece tube element defining respective longitudinal dovetail-shaped tracks on opposite sides thereof for receiving connection elements, and open top and bottom ends, and a removable top cover attached to said first tube element to completely cover said open top end thereof, said first one-piece tube element having a first wall with an opening and the second coupling part is arranged in connection with said opening.

2. The motor operator according to claim 1, including a second sub-housing for electrical equipment.

3. The motor operator according to claim 2, including a third sub-housing for a rechargeable battery package.

4. The motor operator according to claim 3, including a fourth sub-housing for a location system.

5. The motor operator according to claim 4, wherein said first one-piece tube element has an essentially rectangular cross section.

6. The motor operator according to claim 3, wherein a lay-out of the cross section of the second sub-housing is such that the first and the third sub-housing are arranged on top of the second sub-housing within a perimeter.

7. The motor operator according to claim 4, including connection elements for connecting the first, second and fourth sub-housings.

8. The motor operator according to claim 4, wherein the second sub-housing is attached to the first and third sub-housing by means of screws received in screw channels.

9. The motor operator according to claim 6, wherein said removable top end cover includes a rim extending around the top end of the first one-piece tube element.

10. The motor operator according to claim 1, wherein said first one-piece tube element consists of extruded aluminum.

11. The motor operator according to claim 10, including screw channels located in an interior of the first one-piece tube element.

12. The motor operator according to claim 2, including a top end cover for the second sub-housing, said top end cover being planar and serving as a base for at least the first sub-housing, and said top end cover having an outer shape mating the cross-section of the second sub-housing.

13. The motor operator according to claim 1, including a bottom end cover for completely covering said open bottom end of said first one-piece tube element, said bottom end cover having an outer shape corresponding to a cross section of the first one-piece tube element.

14. The motor operator according to claim 1, including a framework for supporting the first sub-housing.

15. The motor operator according to claim 14, wherein the framework comprises a vertical beam to which the first sub-housing is mounted.

16. The motor operator according to claim 15, including a U-shaped mounting bracket on said vertical beam to which said first sub-housing is mounted.

17. The motor operator according to claim 16, including connection elements for fixing the first sub-housing and the U-shaped mounting bracket.

18. The motor operator according to claim 15, wherein the framework comprises a lateral beam to which the vertical beam is fixed.

19. The motor operator according to claim 18, wherein the lateral beam has a longitudinal C-shaped track for receiving a retaining plate to which the vertical beam is fixed by screws.

20. The motor operator according to claim 15, including a substructure supporting the switchgear and wherein the framework is mounted on said substructure.

21. The motor operator according to claim 20, including a lateral beam mounted on the substructure by means of mounting brackets.

22. The motor operator according to claim 21, wherein the substructure includes a pair of prongs for receiving the mounting brackets which is of the clamping type with a hole for the prongs.

23. The motor operator according to claim 15, including a top mounting fixture for attaching the first sub-housing to the cabinet of the switchgear.

24. The motor operator according to claim 1, including two first sub-housings for respective drive units for operating individual operating shafts of a switch gear, one second sub-housing for common electrical equipment, and one third sub-housing for a common rechargeable battery package.

25. A motor operator for a high voltage switchgear used in a mains power distribution system, said switchgear including a cabinet having an exterior wall and containing an operating shaft which extends through said exterior wall to an end that includes a first coupling part, said operating shaft being rotatable between at least two positions, said motor operator comprising:

a framework located in front of said exterior wall of said switchgear, said framework including a lateral beam and a vertical beam mounted on the lateral beam, a first sub-housing mounted on said vertical beam, said first sub-housing containing an electromechanical linear actuator having a second coupling part which fits the first coupling part of the operating shaft in an interlocking manner for rotation of said operating shaft with operation of said electromechanical linear actuator, said first sub-housing comprising a first one-piece tube element defining respective longitudinal dovetail-shaped tracks on opposite sides thereof for receiving connection elements, and open top and bottom ends, and a removable top cover attached to said first tube element to completely cover said open top end thereof, a second sub-housing mounted on said lateral beam and beneath said first sub-housing for containing a control unit, and a third sub-housing mounted on said second sub-housing and aside said first sub-housing for containing a battery package.

* * * * *